Figure 1:
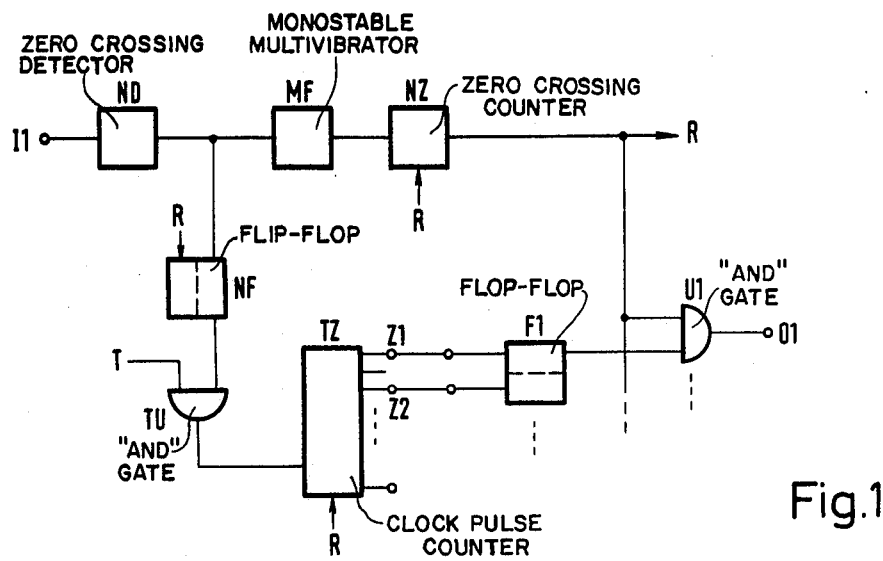

United States Patent [19]

Ohl et al.

[11] 3,971,897
[45] July 27, 1976

[54] CIRCUIT ARRANGEMENT FOR A SELECTIVE SIGNAL RECEIVER, PARTICULARLY FOR USE IN TELEPHONE SYSTEMS

[75] Inventors: Wolf Ohl, Korntal; Herbert Ball, Stuttgart, both of Germany

[73] Assignee: International Standard Electric Corporation, New York, N.Y.

[22] Filed: Aug. 15, 1974

[21] Appl. No.: 497,708

[30] Foreign Application Priority Data
Aug. 16, 1973  Germany............................ 2341223

[52] U.S. Cl. ........................................... 179/84 VF
[51] Int. Cl.² ...................... H04M 1/50; H04Q 1/46
[58] Field of Search ............. 179/84 VF; 324/78 D; 340/171 R, 171 A, 171 PF; 328/138, 140

[56] References Cited
UNITED STATES PATENTS
3,537,001  10/1970  Friend............................ 179/84 VF
3,559,080  1/1971  Kobori................................ 328/140
3,790,720  2/1974  Schartmann.................... 179/84 VF OTHER PUBLICATIONS
International Switching Symposium Record, June, 1972, pp. 434-441, "Digital Multifrequency Tone Receiver" by S. G. Pitroda.

*Primary Examiner*—Kathleen H. Claffy
*Assistant Examiner*—Joseph A. Popek
*Attorney, Agent, or Firm*—J. B. Raden; D. P. Warner

[57] ABSTRACT

Selective digital signal receiver wherein the time distances between zero crossings of the input voltage are measured with a counter. The zero-crossing counter is preceded by a circuit which, when a zero crossing occurs, is changed to the "on" state, resulting in a counting pulse for the counter, and remains in this state for a dwell time which is only little shorter than the signal-frequency half cycle. Thus, interference pulses can no longer invalidate the counting result of each signal-recognition operation.

4 Claims, 6 Drawing Figures

CIRCUIT ARRANGEMENT FOR A SELECTIVE SIGNAL RECEIVER, PARTICULARLY FOR USE IN TELEPHONE SYSTEMS

The present invention relates to a circuit arrangement for a selective signal receiver which, for frequency recognition, counts the zero crossings of the input voltage and measures the time distances between zero crossings, particularly for use in telephone systems.

Such digital signal receivers have already been proposed. They are used in particular for the recognition of pushbutton dial code signals in telephone systems, each of which signals may be formed from two frequencies out of two different groups of several frequencies. In these signal receivers the time distances between zero crossings of the input voltage are measured with a counter which is controlled at a clock frequency higher than the signal frequency to be determined. The input voltage is evaluated as a signal only if the measured value lies between a lower and an upper count determining the bandwidth. Each measurement covers a plurality of cycles of the input voltage, the number of cycles being predetermined and counted with a zero-crossing counter. The lower and upper counts of the clock-pulse counter may be chosen depending on the predetermined number of cycles, on the predetermined tolerances of the signal frequency, and on permissible interference-voltage components.

In such signal receivers it is of decisive importance that the zero-crossing counter, determining the measuring time, count the predetermined number of cycles, i.e. the zero crossings, correctly. It is possible that interference pulses reach the signal receiver, e.g. over the power cable. These interference pulses may impress on the signal voltage additional zero crossings which the zero-crossing counter counts as well. This shortens the measuring time during the frequency-recognition operation, and the value range allotted to the signal frequency is not reached with the clock-pulse counter. The signal receiver then does not evaluate the applied signal as such; in other words, interference pulses may result in signals being suppressed.

The present invention has for its object to provide a circuit arrangement for a selective signal receiver of the kind referred to by way of introduction which avoids the signal suppression due to interference pulses. The invention is characterized in that the zero-crossing counter is preceded by a circuit which, at the occurrence of a zero crossing, is changed to the "on" state, resulting in a counting pulse for the zero-crossing counter, and remains held in said state for a dwell time which is only little shorter than the duration of the signal-frequency half cycle and remains uninfluenced by additional zero crossings occurring during said dwell time. If an interference pulse falls within the dwell time of the circuit, it is therefore suppressed; if an interference pulse falls within the interval between the end of the dwell time and the next signal-frequency zero crossing which is not due to an interference pulse, this zero crossing is not counted.

The circuit may be constituted by a monostable multivibrator (one-shot). If the signal receiver is designed — like the aforementioned pushbutton signal receivers — for the evaluation of a plurality of signal frequencies, the dwell time of the circuit or multivibrator is determined by the highest signal frequency.

The invention will now be explained in more detail with reference to the accompanying drawings, showing, by way of example, a preferred embodiment of the invention, and wherein:

FIG. 1 is a schematic diagram showing a portion of an evaluating circuit which forms part of a pushbutton code signal receiver for use in telephone systems, and FIGS. 2 to 6 show voltage waveforms at different points of the circuit diagram of FIG. 1 for the highest and lowest signal frequencies.

The signal receiver of FIG. 1 serves as a code dial signal receiver in telephone systems. During dialling, each dialled digit is formed by generating and transmitting two different frequencies one of which belongs to a first frequency group, while the second belongs to a second frequency group. The signal frequencies of the first frequency group may have the values 697, 770, 852, and 941 Hz, for example, while the second frequency group may consist of the frequencies 1,209, 1,336, 1,477, and 1,633 Hz.

The signal received at the input (not shown) is first amplified in an input amplifier and then applied to two group filters (not shown) for the separation of its two frequency groups. If the received signal is composed of two code-dialling frequencies, the separation of the two frequencies is effected with these group filters. The signal voltages allotted to these frequencies control one limiter (not shown) each; this limiter converts the sinusoidal signal voltage to a square-wave voltage. One square-wave voltage is applied via an input 11 to the evaluating circuit shown in FIG. 1, while the other square-wave voltage is fed to a second evaluating circuit which is similar to the first and not shown. The evaluating circuits determine whether the frequency of the received signal lies within predetermined ranges assigned to the code-dialling frequencies. The result of the evaluating circuit is transferred via the four outputs of each evaluating circuit to a signal output circuit (not shown) which checks whether a signal frequency is present in each frequency group. If the result of this check is positive, the code signal is delivered.

In the evaluating-circuit portion shown in FIG. 1, the square-wave voltage is applied via an input 11, to which may be connected additional circuits (not shown) for improving speech immunity, to a zero-crossing detector ND which produces a spike each time the square-wave voltage passes through zero. A zero-crossing counter NZ, whose counting volume is adjustable, receives these spikes via a monostable multivibrator MF and counts them. When the selected end position of the zero-crossing counter NZ is reached, the latter provides a reset pulse R and resets itself and other circuits at the reset inputs R.

The first spike of the zero-crossing detector ND also sets a flip-flop NF, which then opens an AND-circuit TU for the passage of clock pulses arriving at the input T. The clock pulses, coming from a clock generator (not shown), have a relatively high frequency as compared to the signal frequencies to be determined and are counted by a clock-pulse counter TZ until resetting is effected by the zero-crossing counter NZ. The clock-pulse counter TZ has a number of outputs. For each code signal frequency a lower count and an upper count can be tapped. It is assumed, for example, that an output Z1 allotted to the lower count and an output Z2 allotted to the upper count are provided for the frequency $f_1$. The output Z1 is connected to the set input of a flip-flop F1, whose reset input is connected to the output 02. Analogously, a flip-flop F2 allotted to the frequency $f_2$ and two additional flip-flops (not shown) are connected to associated outputs of the clock-pulse counter TZ. The outputs of these flip-flops are connected, respectively, to one input of individually associated AND-circuits U1 . . . , whose other inputs are connected to the reset output R of the zero-crossing counter NZ. The outputs of these AND-circuits are connected to the signal output circuit as is indicated by the output 01 of the AND-circuit U1.

If the value counted during the time between the setting of the flip-flop NF and the resetting of the zero-crossing counter NZ lies between the values Z1 and Z2, the flip-flop F1 is in its "on" state. Then, as an indication that the frequency $f_1$ has been determined, an output signal is delivered via the output 01 when the end position of the zero-crossing counter NZ has been reached, the output R thus having been marked. Each measurement covers a plurality of cycles of the alternating voltage applied to the input I1. The number of cycles is predetermined by the selection of the end position of the zero-crossing counter NZ. The lower count Z1 and the upper count Z2 as well as the analogous counts for the other frequencies are chosen depending on the predetermined number of cycles, on the predetermined tolerances of the signal frequencies, and on permissible interference-voltage components.

The multivibrator MF ahead of the zero-crossing counter NZ is designed so as to change to the "on" state at the occurrence of a zero crossing of the voltage at the input I1, which zero crossing is detected by the zero-crossing detector ND, and to remain in this state for a dwell time which is only little shorter than the duration of the half cycle for the highest signal frequency. Furthermore, this multivibrator is so designed that its dwell time cannot be influenced by additional zero crossings occurring during the dwell time.

Figure 2:
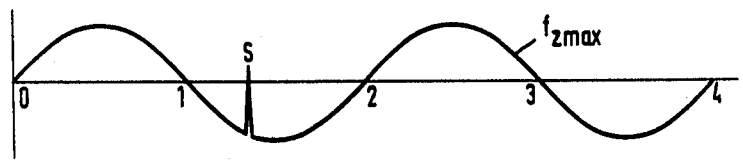
Figure 3:
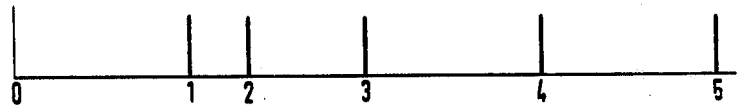
Figure 4:
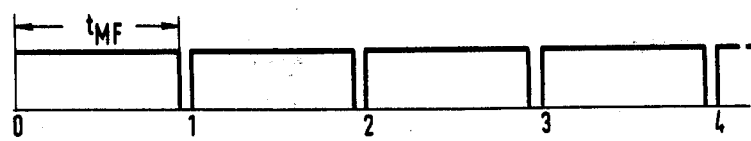
Figure 5:
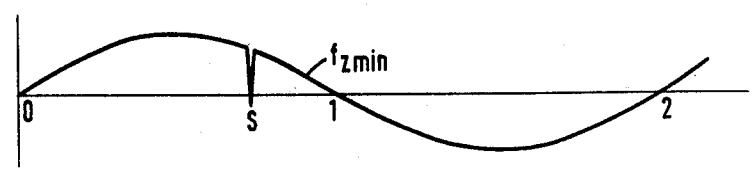

The operation of the multivibrator MF will now be explained with the aid of FIGS. 2 to 6. FIG. 2 shows the voltage waveform of a signal from which the input voltage at the input I1 of FIG. 1 is derived and which has the highest signal frequency $f_{z\ max}$, (e.g. 941 Hz) for the arrangement of FIG. 1, while FIG. 5 shows the voltage waveform of a signal with the lowest signal frequency $f_{z\ min}$ (e.g. 697 Hz) for the arrangement of FIG. 1. At the point S both voltages have dips, which emanate from interference pulses and cause zero crossings of the signal voltage. FIG. 3 shows the spikes 0 to 5 appearing at the output of the zero-crossing detector ND and delivered by the latter in response to zero crossings 0, 1, S, 2, 3, 4 of the signal voltage of FIG. 2.

Figure 6:
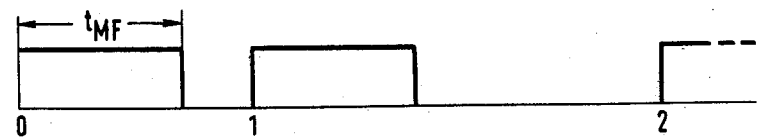

In a similar manner (not shown), for the signal frequency $f_{z\ min}$ of FIG. 5, spikes resulting from the zero crossings 0, S, 1, 2 appear at the output of the zero-crossing detector ND. The output of the multivibrator MF delivers the pulses of FIG. 4 for the highest signal frequency $f_{z\ max}$ and the pulses of FIG. 6 for the lowest signal frequency $f_{z\ min}$. The duration $t_{MF}$ of these pulses is constant and only little shorter than the duration 0–1 of the half cycle for the highest signal frequency $f_{z\ max}$. From FIG. 4 it can be seen that the interference pulse S is covered. FIG. 6 shows that, while the interference pulse S is counted, the zero crossing 1 following the interference pulse S in FIG. 5 is not counted. At the end of the signal (not shown in FIGS. 2 to 6), the correct counting value thus occurs in spite of interference pulses.

What is claimed is:

1. A circuit arrangement for a selective signal receiver which, for frequency recognition, counts the zero crossings of an input signal occurring at each signal-frequency half cycle and measures the time distances between the zero crossings, particularly for use in telephone systems, comprising a circuit operable between a normal "off" state and an "on" state, a zero-crossing counter coupled to said circuit, said circuit responding to the occurrence of a zero crossing to change to the "on" state and provide a counting pulse for the zero-crossing counter, said circuit remaining in said "on" state for a dwell time which is only little shorter than the duration of the signal-frequency half cycle and remaining uninfluenced by additional zero crossings occurring during said dwell time, said circuit which measures the time distance between the zero crossings including means for counting clock pulses during said dwell time and means for providing an output at the end of said dwell time if the number of clock pulses counted is within a prescribed range.

2. The invention according to claim 1, in which the circuit is a monostable multivibrator.

3. The invention according to claim 1, in which the signal receiver includes means to enable the evaluation of a plurality of signal frequencies, and the dwell time of the circuit is determined by the highest signal frequency.

4. The invention according to claim 2, in which the signal receiver includes means to enable the evaluation of a plurality of signal frequencies and the dwell time of the multivibrator is determined by the highest signal frequency.

* * * * *